Patented Jan. 17, 1928.

1,656,834

UNITED STATES PATENT OFFICE.

WINFIELD SCOTT, OF AKRON, OHIO, ASSIGNOR TO THE RUBBER SERVICE LABORATORIES COMPANY, OF AKRON, OHIO, A CORPORATION OF OHIO.

VULCANIZATION OF RUBBER.

No Drawing. Application filed May 6, 1927. Serial No. 189,462.

The present invention is directed to the art of manufacturing vulcanized rubber. The invention is particularly concerned with the production of a vulcanized rubber of high quality, and possessing desirable commercial characteristics, by a process wherein a new type of accelerator is used for the vulcanization step. The manufacture and means of employing the new preferred class of accelerators is fully set forth hereinafter and will be readily understood by the following description and examples.

Certain mercapto compounds such as mercapto-benzothiazole heretofore have been described as of value in accelerating the vulcanization of a rubber mix. Moreover, mercapto compounds, that is compounds containing a C-SH grouping, in which the hydrogen of the sulphydrate group is sufficiently acidic to react with organic bases may be reacted with various bases to form products useful as rubber vulcanization accelerators as are disclosed in a copending application Serial No. 61,587 filed by me October 9, 1925.

I have now further found that compounds obtained by the action of aldehydes upon the products formed by the combination of organic bases with mercapto compounds may be readily prepared and comprise a class of new materials having a very desirable accelerating action upon the rubber vulcanization process. The manufacture of such compounds is described and claimed in an application Serial No. 75,433, filed December 14, 1925. The subject matter of the present application, which is a division of this last mentioned application, comprises the use of such compounds in the manufacture of vulcanized rubber products. The invention will be readily understood from the following description and examples illustrative of the process and product claimed.

The following is one example of a preferred method of manufacturing one of my new type of accelerating compounds.

One molecular proportion of a mercapto-compound, for example 167 parts by weight of mercapto-benzo-thiazole, is combined with one molecular proportion of an organic base, for example 239 parts by weight of di-o-tolyl-guanidine, by heating the substances together, preferably with stirring, until the mixture is liquefied and homogeneous. The mixture is preferably maintained at a temperature slightly below the melting point of the highest melting component present. In the case of the compounds mentioned a temperature of approximately 135-140° C. is most desirable. When the mixture is thoroughly homogeneous, it is maintained in a fluid condition until the reaction is completed, whereupon the mass is allowed to cool and solidify and is then ground to a fine powder. This powder is then treated with one molecular proportion (70 parts) of croton-aldehyde or with an equivalent proportion of some other aldehyde, preferably of the aliphatic series.

Inasmuch as the reaction product of an organic base and a mercapto compound, when combined as described with an aldehyde, evolves more or less heat, it is desirable, particularly when an aldehyde boiling at moderate temperatures be employed. that the reaction be carried out within a tightly enclosed vessel, or that the vessel or chamber be equipped with a cooling means to condense and return by reflux any aldehyde that vaporizes. The reacting mixture soon becomes pasty, and rapidly becomes so viscous that some heating is usually necessary to keep the mixture fluid enough to permit stirring. After the reaction with the aldehyde is completed, the liquid mass is withdrawn from the reaction chamber, and is allowed to cool and solidify. The solid material, in the case of the croton-aldehyde reaction product of the di-orthotolyl guanidine salt of mercapto-benzo-thiazole, is a hard slightly yellowish resin which can be readily ground and is then ready for use as a vulcanization accelerator.

It is of course possible to replace the ingredients particularly mentioned in the example given above with equivalent materials. In place of mercapto-benzo-thiazole, I may employ mercapto-tolyl-thiazole, thio-cresol, thio-phenol, butyl-mercaptan, di-n-amino-di-thio-carbamic acids, or in fact, any mercapto compound wherein the C-SH group present possesses sufficient acidity to react with an organic base. Thus, I may also use thio-acet-anilide, which in one of its isomeric forms possesses the structure of a mercaptan. Similarly, other bases than di-o-tolyl-guanidine may be employed in the example as given. Thus, I may likewise employ di-phenyl-guanidine, piperidine, enthanolamine, as well as other organic bases, particularly the primary and secondary amines. It is also possible to use other aldehydes than croton-aldehyde in the preparation of my final product. Thus, such aldehydes as aldol, acetaldehyde, propionaldehyde, heptaldehyde, and other saturated and unsaturated aldehydes, particularly of the aliphatic series may be used.

The aldehyde reaction products of the "salts" obtained by reacting mercaptans with bases, comprise a class of compounds particularly useful as accelerators of the vulcanization of rubber. Their usefulness for this purpose is greatly enhanced because of their resinous nature whereby their ready and complete dispersion into the rubber mix can be accomplished. One method of employing this new type of compound in a rubber mix is illustrated by the following example, wherein 100 parts of rubber, such as pale crepe rubber, 5 parts of zinc oxide, 3.5 parts of sulfur, and 0.3 parts of one of the compounds hereinbefore described, for example, the croton-aldehyde derivative of the reaction product of di-o-tolyl-guanidine and mercapto-benzo-thiazole, are compounded together in the usual manner on the differential mixing mills. The rubber compound so prepared was then vulcanized in the usual manner at the temperature given by steam at a pressure of 40 pounds per square inch. After heating under these conditions for a period of 30 minutes, the vulcanized product was found to possess a modulus at 700% elongation, of 1635 pounds per equare inch, a tensile strength at break of 3120 pounds per square inch and an ultimate elongation of 810%. When 0.5 parts of the aldol reaction product of the salt formed by the combination of mercapto-benzo-thiazole and di-phenyl-guanidine is substituted for the accelerator employed in the example above, and the mixture heated at a temperature of 20 pounds of steam per square inch for 15 minutes, the product is found to possess a tensile strength of 2855 pounds per squared inch and an ultimate elongation of 870%.

The aldol reaction product of the salt formed by the combination of mercapto-benzo-thiazole and di-o-tolyl-guanidine, may be employed in the example given above in place of the accelerator employed therein. This material can be prepared by adding one molecular proportion of aldol to the melted reaction product of equal molecular proportions of mercapto-benzo-thiazole and di-o-tolyl-guanidine. The mass is maintained in a molten condition and is stirred until the mixture is homogeneous and completely reacted. The product after cooling, solidifies to a hard brittle yellowish resin which can be ground readily. This product may be used in the proportion of 0.5 parts of the accelerator with 100 parts of pale crepe rubber, 5 parts of zinc oxide, and 3.5 parts of sulfur, and the mix vulcanized in the usual manner. When the composition is heated in a press for a period of about 60 minutes at the temperature given by 20 pounds of steam pressure per square inch the product is found to have a modulus of 3030 at 700% elongation, a tensile strength at break of 4280 pounds per square inch, and an ultimate elongation of 780%. Equally favorable results are realized when the composition is heated at higher temperatures, although in such cases a completely vulcanized product is, of course, obtained in a shorter period of time, than that given in the example.

Another material included among my new type of accelerators is obtained by reacting 0.5 molecular proportions of heptaldehyde with one molecular proportion of the product obtained by melting together (and combining in the manner hereinbefore set forth) equal molecular proportions of mercapto-tolyl-thiazole (2 methyl-mercapto-benzo-thiazole) and di-ortho-tolyl-guanidine. This product, when compounded in the usual manner in the proportion of 0.5 parts accelerator, with 100 parts of rubber, 5 parts of zinc oxide, and 3 parts of sulfur, and vulcanized in a press at a temperature given by 40 pounds of steam per square inch, gives a vulcanized product of high quality after heating for approximately 60 minutes. This particular accelerator is somewhat slower, that is, it requires a slightly longer time to exert its full accelerating effect than do certain other members of my new class of compounds, but as this accelerator yields vulcanized rubber products having higher tensile strengths on longer cures, it is employed advantageously in stocks requiring long heating without overcuring.

Other compounds included within my new preferred class of accelerators may be prepared by the process hereinbefore described. For example, croton-aldehyde has been reacted upon the reaction product of piperidine and mercapto-benzo-thiazole; croton-aldehyde has been reacted upon the reaction product of di-o-tolyl-guanidine and thio-acet-anilide; aldol has been reacted upon the reaction product of ethanol-amine and thio-cresol; propionic aldehyde has been reacted on the di-o-tolyl-guanidine salt of di-n-butyl-amino-di-thio-carbamic acid. These various compounds have been found to possess valuable and desirable vulcanization accelerating properties when employed in a rubber mix.

Accelerators similar in properties and action to those described may be prepared by the action of other aldehydes upon the reaction product of other bases and mercapto compounds. Thus, in place of the aldehydes mentioned, formaldehyde, acetaldehyde, butaldehyde, iso-valeric aldehyde, acrolein, cinnamic aldehyde, or other aldehydes may be used. In case a readily volatilizable aldehyde be used in reacting on the molten salt, it is desirable that the reaction be carried out within an enclosed chamber, or that a stream of the aldehyde vapor be bubbled through the melted mixture. Broadly then, my invention comprises the use in the rubber vulcanizing process of relatively small quantities of accelerating compounds produced by the reaction of aldehydes, preferably of the aliphatic series with salts formed by the action of organic bases upon mercaptan compounds and derivatives of the mercaptans containing the C-SH group.

While, in describing my invention, I have referred to certain specific details, it will be understood that these are illustrative only, and not limitative. Nor is my invention to be considered as dependent upon the accuracy of any theory or reason suggested to explain the advantageous results realized. On the contrary, the invention is to be regarded as limited only as defined in the following claims, in which it is my intention to claim all novelty inherent in my invention as broadly as is permissible in view of the prior art.

What I claim is:

1. The process of vulcanizing rubber which comprises heating a mixture of rubber and sulphur in the presence of an accelerator including an aldehyde derivative of the reaction product of an organic base and a mercapto compound containing a C-SH grouping.

2. The process of vulcanizing rubber which comprises heating a mixture of rubber and sulphur in the presence of an accelerator including an aldehyde derivative of the reaction product of a substituted guanidine and an aromatic mercaptan containing a C-SH grouping.

3. The process of vulcanizing rubber which comprises heating a mixture of rubber and sulphur in the presence of an accelerator including an aldehyde derivative of the reaction product of an aryl-substituted-guanidine and a derivative of an aromatic mercaptan containing a C-SH grouping.

4. The process of vulcanizing rubber which comprises heating a mixture of rubber and sulphur in the presence of an accelerator including an aliphatic aldehyde derivative of the reaction product of an aryl-di-substituted-guanidine and an aromatic mercaptan containing the C-SH grouping.

5. The process of vulcanizing rubber which comprises heating a mixture of rubber and sulphur in the presence of an accelerator including a croton-aldehyde derivative of the reaction product of di-o-tolyl-guanidine and mercapto-benzo-thiazole.

6. The process of vulcanizing rubber which comprises heating a mixture of rubber and sulphur in the presence of an accelerator including an aldehyde derivative of the reaction product of a secondary amino compound and a mercaptan containing the C-SH grouping.

7. The process of vulcanizing rubber which comprises heating a mixture of rubber and sulphur in the presence of an accelerator including an aldehyde derivative of an organic salt produced by the neutralization of a compound containing a C-SH grouping with an organic base.

8. The process of vulcanizing rubber which comprises heating a mixture of rubber and sulphur in the presence of an accelerator including an aliphatic aldehyde derivative of an organic salt produced by the neutralization of a compound containing a C-SH grouping with a nitrogen containing basic compound.

9. The process of vulcanizing rubber which comprises heating a mixture of rubber and sulphur in the presence of an accelerator including an unsaturated aliphatic aldehyde derivative of the reaction product of an organic compound of basic nature with an aryl thiazole.

10. The process of vulcanizing rubber which comprises heating a mixture of rubber and sulphur in the presence of an accelerator including a croton-aldehyde derivative of the reaction product of a di-aryl-substituted-guanidine with an aryl thiazole.

11. The process of vulcanizing rubber which comprises heating a mixture of rubber and sulphur in the presence of an accelerator including an aldehyde derivative of the reaction product of an amine with an organic compound containing the sulphydrate group.

12. The process of vulcanizing rubber which comprises heating a mixture of rubber and sulphur in the presence of an accelerator including an aldehyde derivative of the reaction product of an organic derivative of ammonia with a mercapto compound containing a C-SH grouping.

13. The vulcanized rubber product produced by heating a mixture of rubber and sulphur in the presence of an accelerator including an aldehyde derivative of the reaction product of an organic base and a mercapto compound containing a C-SH grouping.

14. The vulcanized rubber product produced by heating a mixture of rubber and sulphur in the presence of an accelerator including an aldehyde derivative of the reaction product of a substituted guanidine and an aromatic mercaptan containing a C-SH grouping.

15. The vulcanized rubber product produced by heating a mixture of rubber and sulphur in the presence of an accelerator including an aldehyde derivative of the reaction product of an aryl-substituted-guanidine and a derivative of an armoatic mercaptan containing a C-SH grouping.

16. The vulcanized rubber product produced by heating a mixture of rubber and sulphur in the presence of an accelerator including an unsaturated aliphatic aldehyde derivative of the reaction product of an aryl-di-substituted-guanidine and an aromatic mercaptan containing a C-SH grouping.

17. The vulcanized rubber product produced by heating a mixture of rubber and sulphur in the presence of an accelerator including a croton-aldehyde derivative of the reaction product of di-o-tolyl-guanidine and mercapto-benzo-thiazole.

18. The vulcanized rubber product produced by heating a mixture of rubber and sulphur in the presence of an accelerator including an unsaturated aldehyde derivative of the reaction product of an organic compound of basic nature with an aryl thiazole.

19. The vulcanized rubber product produced by heating a mixture of rubber and sulphur in the presence of an accelerator including an aldehyde derivative of the reaction product of an organic derivative of ammonia with a mercapto compound containing a C-SH grouping.

In testimony whereof I have affixed my signature.

WINFIELD SCOTT.